2,853,519
PESTICIDALLY ACTIVE AMINE SALTS

Richard S. Cook, Rockledge, and W E Craig, Philadelphia, Pa., assignors to Rohm & Haas Company, Philadelphia, Pa., a corporation of Delaware No Drawing. Application July 20, 1956
Serial No. 598,992

6 Claims. (Cl. 260—556)

This invention concerns pesticidally active amine salts of N-4-nitrophenyl-3,4-dichlorobenzenesulfonamide.

It was discovered by Dr. W. F. Hester that N-4-nitrophenyl-3,4-dichlorobenzenesulfonamide was an effective toxicant for combatting mosquito larvae and some insects which attack plants such as army worm and aphids. We hoped to improve the action of this compound and derive from it some general pesticides which would be active against a wide spectrum of plant pests and with a more favorable ratio of toxicity against plant pests to phyto-toxicity. We discovered that amine salts could be formed. For the most part, however, these proved to have low overall activity. There was no direct relationship to be observed between molecular weight or type of amine salt and biological activity. The data indicated that the biological activity of the various amine salts was a function of the salt molecule as a whole and was not merely a function of the sum of the biological properties of the starting compounds or component groups from which the salts were made. In fact in many cases the amine salts were noticeably less toxic than the N - 4 - nitrophenyl - 3,4 - dichlorobenzenesulfonamide as found for example in the case of salts of allylamine, allyldimethylamine, N-dodecyl-N-cyclohexylamine, dicyclohexylamine, morpholine, or 1,4-bis(dimethylamino)-but-2-yne.

In view of the generally unpromising results obtained in the above reported study, it was unexpected to find a few specific amine salts having general pesticide properties and presenting activities which could not be anticipated by a knowledge of the component parts.

The amine salts which we have discovered as effective general pesticides are those of N-4-nitrophenyl-3,4-dichlorophenylsulfonamide and alkyldimethylamines in which the alkyl group contains 16 to 18 carbon atoms, caprylamine, $H_2NCH(CH_3)C_6H_{13}$, and tert-alkylamines in which the alkyl group contains 8 to 15 carbon atoms. These salts provide action as stomach and contact poisons against insects, as miticides, and as fungicides.

The amine salts of this invention are prepared by forming a slurry of N-4-nitrophenyl-3,4-dichlorobenzenesulfonamide in an inert organic solvent such as benzene, toluene, or a naphtha, mixing an amine therewith in about an equivalent proportion, and separating the resulting amine salt.

The temperature of reaction may be from 10° to 60° C. The resulting amine salt is usually soluble in the solvent, but sometimes may be precipitated therefrom. The reaction mixture may, if desired, be filtered and, if the salt is soluble, solvent is conveniently distilled off at reduced pressure to leave an oil or a solid which is the desired amine salt. In a few cases the amine salt forms as a solid, particularly when the reaction mixture is cooled and it can then be separated by filtration.

Examples of preparation of salts of this invention are given to illustrate their method of formation. These typical examples are not presented for purposes of limitation. Parts are by weight unless otherwise designated.

*Example 1*

To 34.7 parts of N-4-nitrophenyl-3,4-dichlorobenzenesulfonamide slurried in 100 parts of toluene is rapidly added 33.7 parts of stearyldimethylamine which has a neutral equivalent of 337 and which has been heated until molten. The reaction mixture is stirred. It increases in temperature from about 20° to about 30° C. A clear brown solution forms. It is heated under reduced pressure while the toluene is distilled off, leaving a brown viscous gum amounting to 69 parts and corresponding in composition to the stearyldimethylamine salt of N-4-nitrophenyl-3,4-dichlorobenzenesulfonamide. It contains 2.1% of tritratable nitrogen while the calculated nitrogen content is 2.05%, based on a molecular weight of 684.2.

In the same way equivalent weights of N-4-nitrophenyl-3,4-dichlorobenzenesulfonamide and cetyldimethylamine are reacted to give the corresponding salt as a viscous gum, having a total nitrogen content of 6.8%, corresponding closely to theory.

In place of the individual alkyldimethylamines there may be used a mixture containing stearyldimethylamine and cetyldimethylamine.

*Example 2*

To a slurry of 69.4 parts of N-4-nitrophenyl-3,4-dichlorobenzenesulfonamide in 500 parts of benzene at about 30° C. there is added with agitation 25.8 parts of tert-octylamine, $(CH_3)_3CCH_2C(CH_3)_2NH_2$. The temperature of the reaction mixture shows a small rise and the mixture becomes clear. In a short while, however, a solid begins to precipitate. The mixture is cooled to about 10° C. and filtered to yield 78.5 parts of a solid corresponding in composition to the N-1,1,3,3-tetramethylbutylamine salt of N-4-nitrophenyl-3,4-dichlorobenzenesulfonamide. It is a tan solid melting at 140°–144° C. The yield is 82.4%. The analysis is nitrogen 8.5%, chlorine 15.9%, and sulfur 6.7% (theory 8.8%, 14.9%, and 6.7% respectively).

*Example 3*

To a slurry of 57 parts of N-4-nitrophenyl-3,4-dichlorobenzenesulfonamide in 500 parts of benzene at 35° C. there is added 33 parts of tert-tridecylamine (neutral equivalent 201). A clear brown solution forms. The solvent is removed on a steam bath under reduced pressure to give 90 parts of light brown viscous oil. It contains by analysis 2.5% of titratable nitrogen (theory 2.56% based on a molecular weight of 548.5).

In the same way there are reacted equivalent weights of N-4-nitrophenyl-3,4-dichlorobenzenesulfonamide and a commercial tert-alkylamine (neutral equivalent 191) consisting of a mixture of tert-alkylamines from $C_{12}$ to $C_{15}$. The salt thus formed is a viscous oil. This product, although a mixture of salts, is an effective pesticide and acts in the same way as the individual salts.

*Example 4*

To a slurry of 56.1 parts of N-4-nitrophenyl-3,4-dichlorobenzenesulfonamide in 500 parts of benzene is added 24 parts of caprylamine. The temperature of the mixture increases from 26° to 30° C. and a clear solution forms. An attempt is made to form a solid by cooling, but no solid separates. The reaction mixture is heated under reduced pressure to drive off the benzene. There results 81 parts of a yellow oil, which solidifies when cooled. It melts at 63°–66° C. and corresponds by analysis to the desired salt, containing 17% of chlorine, 6.3% of nitrogen, and 7.6% of sulfur (theory 16.5%, 6.5%, and 7.4% respectively).

The amine salts of this invention are extended with a carrier or diluent before application to plants. They may be used in the form of dusts, wettable powders, or emulsifiable concentrates.

Dusts may contain from 1% to 10% of a salt, which is dispersed in or coated on a finely divided solid, such as talc, clay, silica, calcium or magnesium carbonate, or other finely divided inert solid or mixtures thereof. The amine salt may be dissolved in a volatile organic solvent, the solution mixed with the solid, and the solvent evaporated. A dispersing agent, such as a condensed naphthalene-formaldehyde sodium sulfonate or a lignin sulfonate, may be added.

Wettable powders may be similarly prepared except that the proportion of amine salt is made higher and usually a wetting agent is added. Wettable powders may also be prepared by milling amine salt and solid carrier together. Wettable powders usually contain 20% to 30% of amine salt, 1% to 2% of a dispersing agent, and 1% to 4% of a wetting agent, such as an alkylphenoxypolyethoxyethanol, or other non-ionic agent, a sodium alkylbenzenesulfonate, sodium lauryl sulfate and comparable sodium alkyl sulfates and sulfonates, octylphenoxyethoxyethyl sodium sulfonate, and the like.

The salts may also be used from solutions in organic solvents, this being one of the advantages of these salts over the free sulfonamide. Solutions in an inert organic solvent, such as toluene, xylene, or an aromatic naphtha are treated with an oil-soluble emulsifying agent, such as an octylphenoxypolyethoxyethanol or such agent plus calcium dodecylbenzenesulfonate or calcium dioctyl sulfosuccinate. The solution may contain 10% to 25% of the toxicant and 2% to 6% of emulsifier. When this composition is extended with water, it provides a spray in which the toxicant is well dispersed.

A few typical formulations are given to illustrate pesticidal compositions. For example, there may be mixed five parts of the stearyldimethylamine salt of N-4-nitrophenyl-3,4-dichlorobenzenesulfonamide and 85 parts of a finely particled Georgia clay and eight parts of fuller's earth and two parts of sodium naphthalene-formaldehyde sulfonate are admixed to give a dust.

A wettable powder may be prepared by mixing 25 parts of an amine salt, such as the tert-octylamine salt of N-4-nitrophenyl-3,4-dichlorobenzenesulfonamide and 66 parts of clay and adding thereto three parts of octylphenoxypolyethoxyethanol on five parts of magnesium carbonate and one part of sodium naphthalene-formaldehyde sulfonate.

A typical emulsifiable concentrate is made from the tert-tridecylamine salt or the salt of mixed tert-alkylamine with alkyl groups from 12 to 15 carbon atoms (25 parts), xylene 71 parts, three parts of an emulsifier from polyglycerol, oleic acid, and a small amount of phthalic acid, and one part of nonylphenoxypolyethoxyethanol.

Tests were made against the army worm to evaluate the stomach poison activity of the stearyldimethylamine salt of N-4-nitrophenyl-3,4-dichlorobenzenesulfonamide. A 5% dust gave a kill of 97% after 24 hours and a 3% dust a kill of 93%. A wettable powder diluted with water to supply 0.5 and 0.25 pound per 100 gallons gave kills in both cases of 100%. An emulsifiable concentrate applied at rates of two pounds and one pound per 100 gallons gave kills of 97% in both cases.

Tests with stearyldimethylamine itself at such rates gave no control. Tests with the free sulfonamide at the weights used for the salt showed 96% kill from the wettable powder for army worm. The above salt gave three to five times the kill of bean beetle given by the free sulfonamide.

Against the rice weevil the above salt gave kills at two pounds per 100 gallons of 98%, while the free sulfonamide gave kills of about 30%.

Against red spiders the above amine salt gave kills of 97% at a dilution of 1:800 and 69% at 1:1600, while the free sulfonamide gave a kill of 30%.

In standard fungitoxicity tests on slides wherein the effect on germination of spores of standard test organisms is noted after application to slides of dilute suspensions of the compound under test the above salt provided 95% inhibition of germination at 0.001% against Monilinia fructicola and 88% inhibition of spores of Stemphylium sarcinaeforme when used at 0.01%. The free sulfonamide gave 0% control of the first organism even at 0.1% and 8% inhibition for the latter organism also at 0.1%.

The fungitoxicity data vary with the particular amine salt used. Thus, the tert-octylamine salt at 0.01% inhibited 97% of germination, while the tert-tridecylamine salt inhibited 100% of the germination of spores of Stemphylium sarcinaeforme at 0.01% and 100% of the spores of Monilinia fructicola at 0.005%. The caprylamine salt gave inhibitions of 100% at 0.1% against Stemphylium sarcinaeforme and 100% at 0.005% against Monilinia fructicola.

These salts retain fungitoxicity after exposure to actinic light whereas the free amines are quite sensitive and lose activity rapidly.

Tests of the tert-octylamine salt, the tert-tridecylamine salt, or mixed tert-alkylamine salts of 12 to 15 carbon atoms provide kills of 84% to 89% of rice weevil, these salts being applied from a 25% emulsifiable concentrate diluted with water to give sprays of two pounds per 100 gallons. With a 12.5% emulsifiable concentrate of the caprylamine salt a kill of 89% was found at this same concentration.

The comparable kills with the free sulfonamide at the same dilution are about one-third of the kills above reported. This is a rather remarkable difference when it is considered that at equal weights the free sulfonamide provides a considerably larger proportion of sulfonamide than the salts.

In tests with red spiders a kill of 94% was obtained with the caprylamine salt of N-4-nitrophenyl-3,4-dichlorobenzenesulfonamide diluted from a 12.5% emulsifiable concentrate with water to supply two pounds per 100 gallons. The tert-octylamine salt used in a wettable powder in a dilution to supply one pound per 100 gallons gave a 67% kill, while the mixed tert-alkylamine salt referred to above gave a kill of 89% when used at two pounds per 100 gallons. The free sulfonamide is not effective in the control of acarids, nor are the free amines.

The data gathered from many biological tests demonstrate that on the average the specified amine salts of N-4-nitrophenyl-3,4-dichlorobenzenesulfonamide when considered on a weight basis in general can be said to double the effectiveness of the sulfonamide portion against those pests which are controlled by the sulfonamide. The data show the salts have no more phytotoxicity than the free sulfonamide even though the free amines are fairly phytotoxic. Also, there are pests which are poorly controlled or are not controlled by the free sulfonamide, but are controlled by the specified amine salts.

We claim:

1. Salts of N-4-nitrophenyl-3,4-dichlorobenzenesulfonamide and an amine from the class consisting of tert-alkylamines of eight to fifteen carbon atoms, caprylamine, and alkyldimethylamines having 16 to 18 carbon atoms in the alkyl portion thereof.

2. The salt of N-4-nitrophenyl-3,4-dichlorobenzenesulfonamide and tert-octylamine.

3. The salt of N-4-nitrophenyl-3,4-dichlorobenzenesulfonamide and tert-tridecylamine.

4. The salt of N-4-nitrophenyl-3,4-dichlorobenzenesulfonamide and caprylamine.

5. The salt of N-4-nitrophenyl-3,4-dichlorobenzenesulfonamide and stearyldimethylamine.

6. The salt of N-4-nitrophenyl-3,4-dichlorobenzenesulfonamide and cetyldimethylamine.

References Cited in the file of this patent

UNITED STATES PATENTS

| 2,402,623 | Hester | June 25, 1946 |
| 2,445,319 | Engelbrecht | July 20, 1948 |
| 2,658,916 | Krems | Nov. 10, 1953 |